Jan. 3, 1950     C. WITTENMYER     2,493,709
AUTOMATIC TYPEWRITER Filed Jan. 6, 1944     6 Sheets–Sheet 1

*INVENTOR.*
CARLOS WITTENMYER
BY
*Swan, Byc, & Hardesty*

ATTORNEYS

Jan. 3, 1950  C. WITTENMYER  2,493,709
AUTOMATIC TYPEWRITER

Filed Jan. 6, 1944  6 Sheets-Sheet 2

FIG. 3.

INVENTOR.
CARLOS WITTENMYER
BY
*Swan, Frye & Hardesty*
ATTORNEYS

INVENTOR.
CARLOS WITTENMYER

Jan. 3, 1950          C. WITTENMYER          2,493,709
AUTOMATIC TYPEWRITER

Filed Jan. 6, 1944                                       6 Sheets-Sheet 4

*INVENTOR.*
CARLOS WITTENMYER
BY

ATTORNEYS

Jan. 3, 1950     C. WITTENMYER     2,493,709
AUTOMATIC TYPEWRITER Filed Jan. 6, 1944     6 Sheets-Sheet 5

INVENTOR.
BY CARLOS WITTENMYER

ATTORNEYS

FIG.18.

Patented Jan. 3, 1950

2,493,709

UNITED STATES PATENT OFFICE 2,493,709

AUTOMATIC TYPEWRITER

Carlos Wittenmyer, Mount Clemens, Mich.

Application January 6, 1944, Serial No. 517,154

5 Claims. (Cl. 235—59)

The present invention relates to typewriting machines and more specifically to means adapted to be added thereto for performing automatically certain operations at present performed by the operator or not performed at all.

Among the objects of the invention is means acting automatically upon the depression of a key, to write, for example, the date upon paper in place of the machine, this being only an example, since the means may be arranged equally well to write the time of day, serial numbers or to transfer totals from calculating machines.

Another object is means embodied in such number (time, serial number, calculator) or other machines, to enable such automatic writing.

Still other objects and advantages will be apparent to those skilled in the art upon reference to the following description and the accompanying drawings in which.

Figure 1:
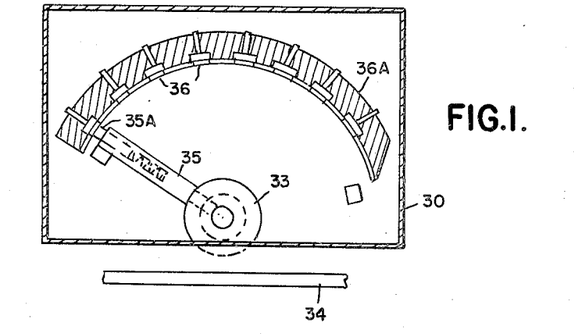
Figure 1 is a plan view of the means for determining typing sequence.
Figure 2:
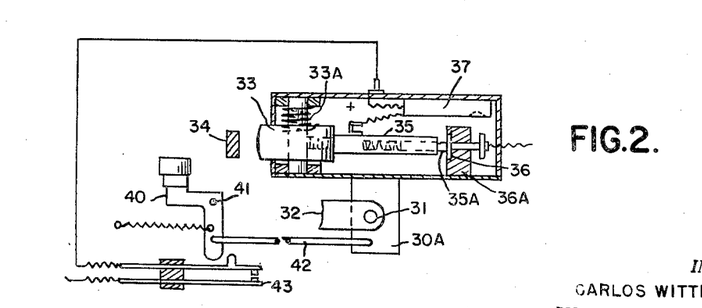
Figure 2 is a vertical central section thereof showing means for putting the same in operation.

In the drawings, Figures 1 and 2 show two views illustrative of the construction of one form of sequence means, this consisting of a suitable casing 30 mounted pivotally as at 31 upon a suitable supporting arm 32 fixed upon any stationary part of a typewriter frame. This casing 30 has mounted in it a rotary member 33 of which a portion protrudes from the casing and is adapted to be pressed against some suitable portion, such as the bar 34 (see Fig. 18), of the typewriter carriage, so that, as the carriage moves in the conventional manner, the member 33 is rotated.

As shown, the member 33 is provided with an arm 35 having in its end a spring pressed contact member 35A adapted to slide over a series of stationary contacts 36 fixed in an arcuate insulating block 36A. Each of the contacts 36 is electrically connected, as described below, certain of them being connected to the contacts carried by rotatable counting wheels or discs, and the others as indicated below. All of the contacts 36 are connected to the operating means for individual typewriter keys, certain of them directly and the others through the counting wheels. The arm 35 is connected to one terminal of a mercury switch 37 mounted upon casing 30 so that the circuit is made when the latter is tilted to bring the member 33 against the bar 34.

Suitable means such as a key 40 may be used to operate the casing 30 and is preferably pivoted as at 41 with its lower end connected by links 42 to the leg 30A of the casing. It is also desirable to provide a switch 43 in series with the mercury switch and operable by the same key 40.

Figure 18:
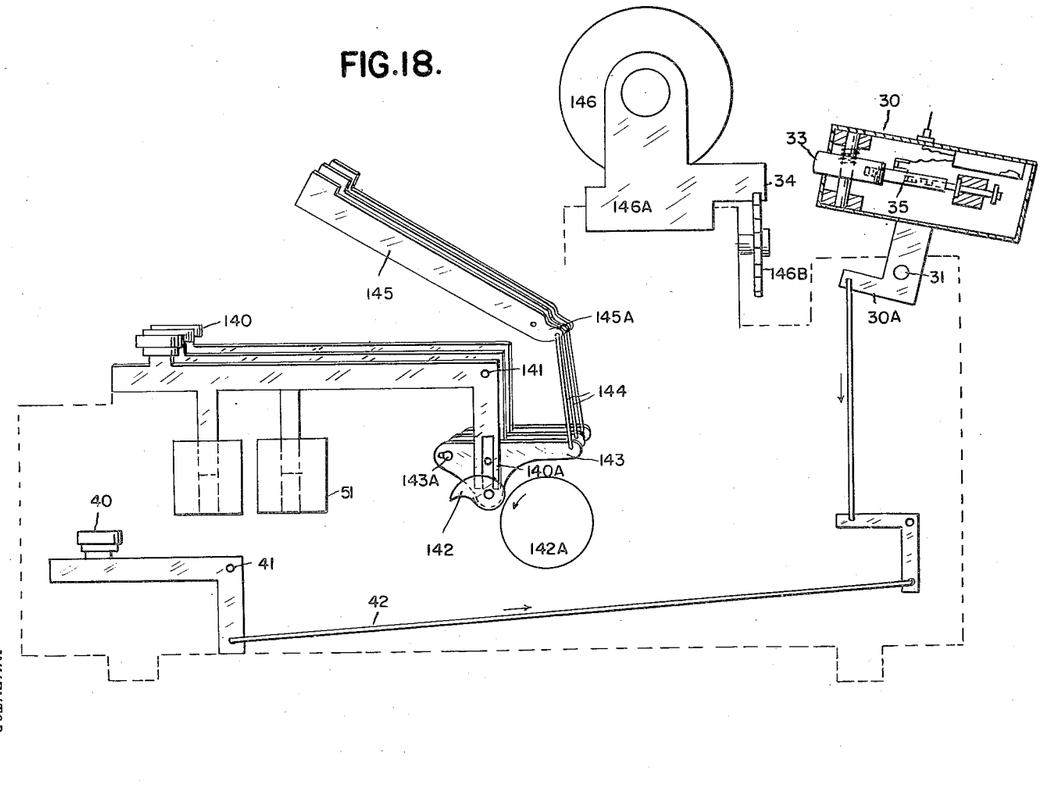
Figure 18 is a diagrammatic showing of parts of an electrically actuated typewriter illustrating the application of the present invention.

In Figure 18 there is illustrated mechanism of an electrically actuated typewriter and an example of how the present invention is applied thereto. In this figure, the typewriter keys 140 and the other mechanism are supported upon a suitable frame. Each of the keys that is to be automatically actuated is provided with an armature piece and a solenoid 51.

The action of the mechanism shown is that of a well known form of electrically operated typewriter such as that shown in Letters Patent of the United States to Thompson, No. 2,223,235, issued November 26, 1940. In such mechanism the key bars 140 are pivoted at 141. Each bar 140 is provided with a downwardly extending fork 140A by means of which, when the key is depressed, a cam 142 is moved to contact with a roller 142A. This roller 142A, when the machine is being operated, is kept in rotation by a suitable motor (not shown) and when the cam 142 comes in contact therewith the latter is instantly pushed downwardly.

Cam 142 is carried upon a lever 143 pivoted at 143A and through link 144 connected to the short lever arm 145A of type bar 145. When, therefore, the cam 142 strikes the roller 142A, the type bar 145 is immediately propelled against the platen 146.

Platen 146 is carried by a suitable carriage 146A which through conventional mechanism is moved intermittently as is usual; this mechanism is not shown, but is indicated by an escapement wheel 146B.

Figure 18 also shows mounted in a convenient position, the key 40, by means of which, through a suitable linkage 42, the sequence means or "timer" 30 is swung forward so as to bring roller 33 into contact with the portion 34 of the carriage 146A.

Figure 3:
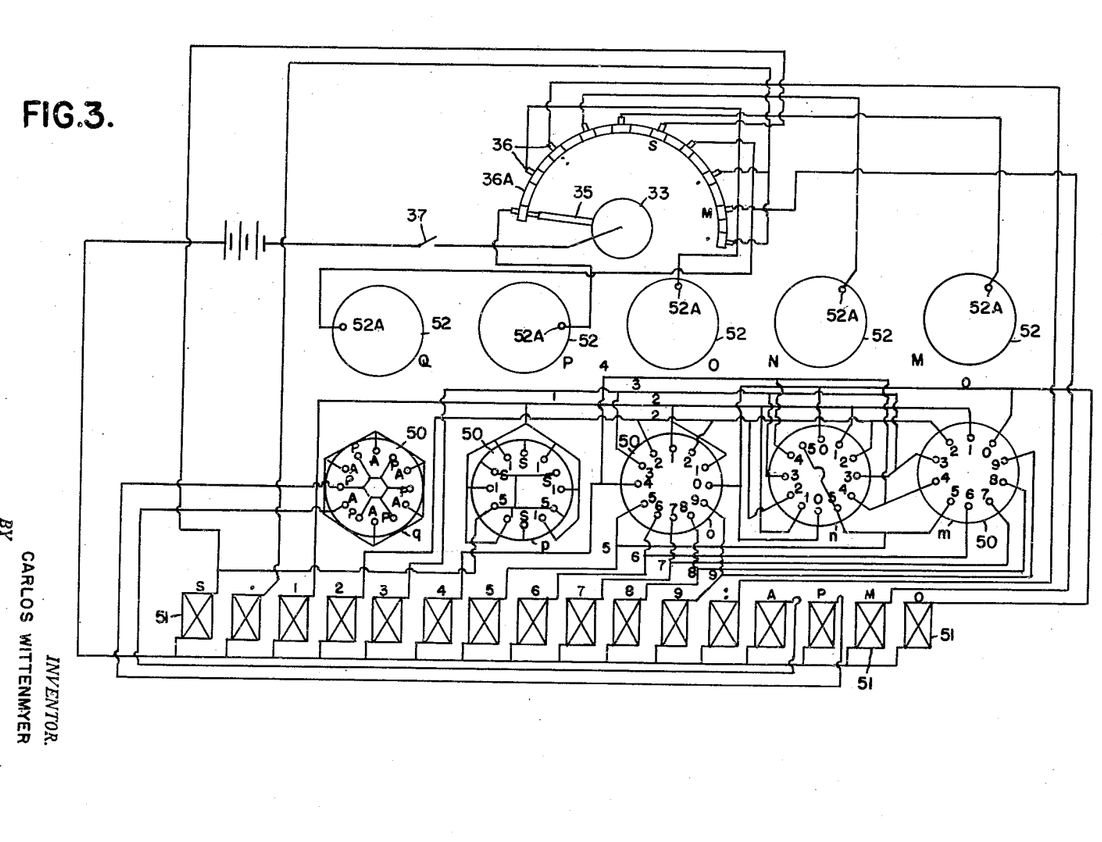
Figure 3 is a wiring diagram showing the time dials and timing discs and electrical connections when the time printing is to be done.

Each of the timer dials 50 shown in Figure 3 is provided with a series of numbers or letters as shown and each is provided with a contact member for each number or letter. These contacts are electrically connected to the key operating means such as the solenoid 51 (Fig. 4), all of the like numbers being connected to the same solenoid 51 and all of the like letters being connected to the solenoid for the key corresponding.

Mounted to rotate adjacent the dials 50 are a series of discs 52 (shown in Fig. 3), each carrying a single contact 52A adapted to contact the several contacts on dials 50 in rotation as the discs move around. These discs 52 with the exceptions noted below, are mounted for driving as are the conventional odometer wheels, i. e., the first disc is driven by suitable means and as it rotates, drives the next one in the series. This second disc drives the third and so on, each revolution of a preceding disc turning the next in line a single index position.

Figure 5:
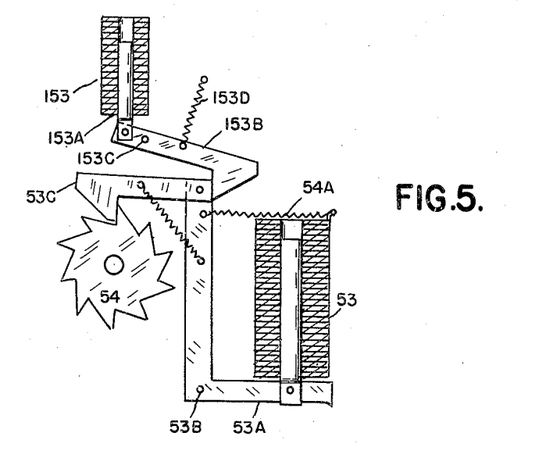
Figure 5 is a sectional view of the means for actuating the time counting means and for holding it during printing.

In the present case, the initial disc M is driven by a time impulse device controlled by a master clock and causing an impulse of any suitable kind, such as for example, completing momentarily a circuit through a solenoid 53 such as is shown in Figure 5. Such a solenoid when energized, lifts the armature 53A pivoted at 53B and causes the pawl 53C to move over one tooth of the ratchet wheel 54. Then, when the solenoid is deenergized, the spring 54A causes the wheel 54 to be moved one tooth. The wheel 54 is fixed in driving relation to the disc M (Fig. 3) and therefore moves the contact 52A from one of the contacts of the first dial 50 (m) to the next.

The positions on the first dial m represent the numbers 0 to 9 and indicate the last figure in a time designation. The positions on the next dial n indicate the next to last figure and represent therefore the tens of minutes. It is preferred to provide this dial n with twelve positions representing two series of 0 to 5. The third dial o represents the second figure of a time designation and has twelve positions—0, 1, 2, 1 to 9. The fourth dial p represents the first figure and therefore only the figure 1 or merely a space without printing. The fifth dial q shows twelve positions alternating A and P and provides for the indication of A. M. or P. M.

As mentioned above, the five discs 52 are driven in the conventional odometer fashion with certain exceptions. In the odometer, it is usual to have the wheels in series with a succeeding wheel indexed one position per revolution of a preceding wheel. In the present device, however, the disc N is indexed one position per revolution of disc M and disc O is indexed one position per revolution of N. The fourth disc P is however indexed twice during each revolution of disc O since it represents the tens of hours. The disc O, therefore, must index the disc P as O moves from 9 to zero so that disc P will move from S (space bar) to 1, and it must again index the disc P as it moves from 2 (indicating 12) to 1 so as to cause the disc P to move from 1 to S (space bar).

Another exception is that the disc Q is also driven by disc O but is indexed one position per revolution of O in the customary manner, the movement of course taking place as the disc O moves from 2 (indicating 12) to 1.

In writing a time designation, for example "11:35 A. M.," it is noted that there are nine characters and one space (or seven, if the spacing and the periods after A and M are omitted), and consequently there should be ten (or seven) contacts in the arcuate contact carrier 35A. Of these, the third, sixth, eighth, ninth, and tenth, are respectively a colon, a space, a period, M and a period, which characters (or space) are always used.

The other characters are changed in accordance with the time and are all represented on and determined by the dials 50 and discs 52. The discs 52 lettered M, N, O, P, Q, coact with the dials m, n, o, p, q respectively; the contact 52A on the disc M passing successively to each of the contacts on dial m, and so on. These contacts 52A are, as indicated in Fig. 3, electrically connected to the segments of arcuate member 36A as follows: the contact on disc p is connected to the first segment. The one on disc O is connected to the second segment; the one on disc N to the fourth segment; the one on disc M to the fifth segment; and the contact on disc Q to the seventh segment.

The segments indicated by a colon (:), by the letters M and S (space bar), and by periods, are connected directly to the corresponding key actuating solenoids, since these characters—colon, period and M—are printed each time and in the same relation to the other characters.

With such an arrangement, as soon as the sequence means 30 is moved into operative position, the circuit is completed through disc P and dial p, since the arm 35 with contact 35A (Fig. 3) in the rest or initial position is opposite the first segment. This causes the immediate operation of either the key printing the numeral 1 or causes the operation of the space key, depending of course, upon which contact of dial 50 is coacting with the corresponding contact 52A. The carriage then moves in its conventional fashion and in so doing, moves the arm 35 one index position to the next segment, thereby completing the circuit through disc O, dial o, and the key solenoid corresponding to the contact on the dial. This keeps on automatically as long as the key 40 is held down. As the dials and discs are shown in Fig. 3, the sequence of characters would be printed to show a time setting of "11:10 P. M."

When the last character has been typed, release of the key 40 will allow the "timer" or sequence means to move out of engagement with part 34 and allow return of the arm 35 to the first position through the action of a suitable spring 33A. At the same time the electric circuit through the timer is broken by the opening of switch 43 so that there is no type bar actuation during the return of the arm 35.

Figure 7:
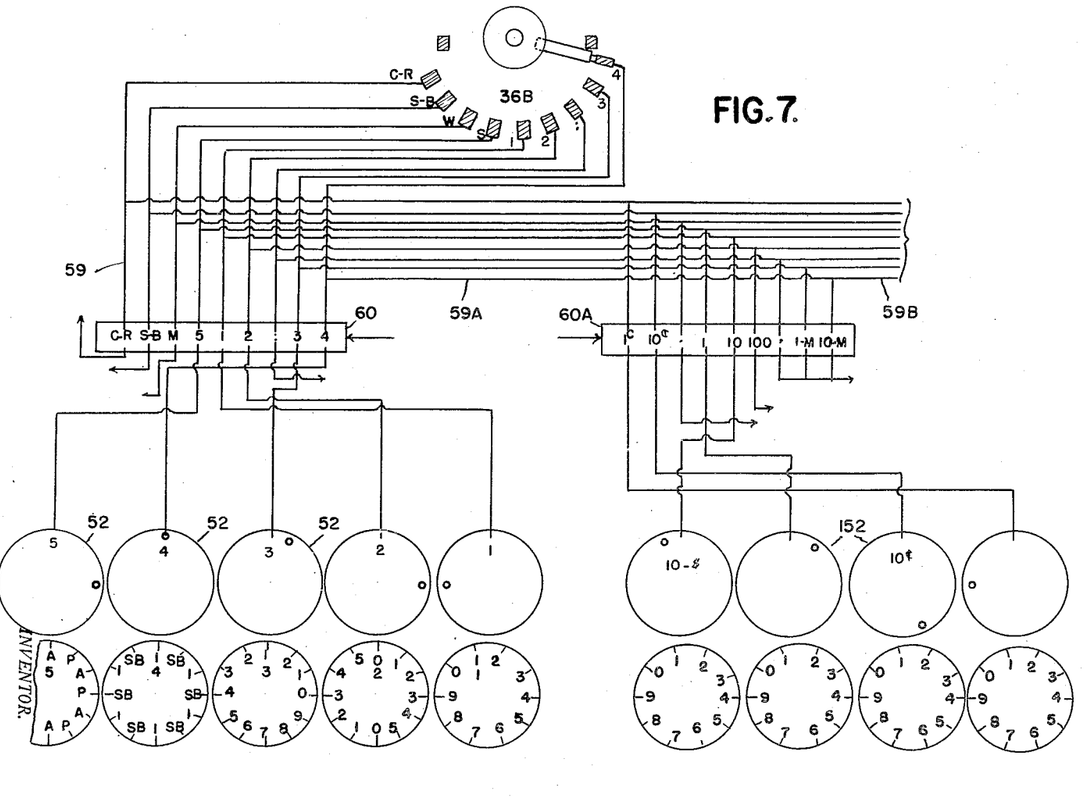
Figure 7 is a diagrammatic representation showing a multiple application of a single sequence means.

In Fig. 7 there is shown a diagram illustrating the use of a single sequence means arranged for the automatic printing of, for example, time notations, accumulations on a calculating machine and data from a third instrumentality. In this figure, the sequence means 36B may be the same as already described but with a sufficient number of contacts to satisfy the requirements of the several instrumentalities and have the contacts therein connected to individual means for putting in or out of action the instrumentality to which it is connected.

For example, in Fig. 7, the sequence means 36B has its contacts connected to gang switches 60 and 60A through suitable wiring 59 and branch wiring 59A while further branch wiring 59B may lead to a third gang-switch and so on. The gang switch 60 is shown as completing the several connections to time counting discs 52 as already described. The gang switch 60A is shown as connecting the sequence means to the accumulator wheels of a calculating machine indicated as a whole at 152. Any suitable form of gang switch may be used, but probably the most practicable form is the conventional relay type shown in Fig. 17, in which, by means of a suitable handle, button, or key (not shown), a circuit is completed through the magnet 65, thereby attracting armature 66 which, swinging about pivot 67, closes contacts 68, there being as many of these as desired.

Figures 8, 9, 17:
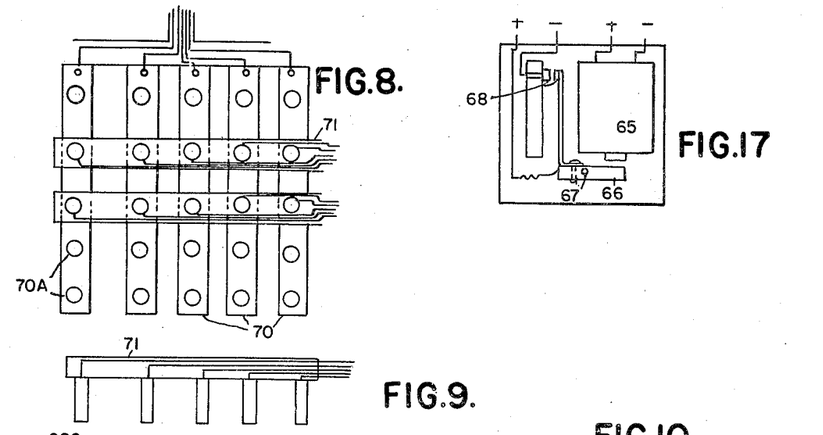
Figure 8 is a diagrammatic showing of plug-in means for such multiple application.
Figure 9 is a representation in side elevation of a plug therefor.
Figure 17 shows a form of gang switch for use in the multiple application of Figure 7.

Instead of, or in addition to, the permanent wiring indicated in Fig. 7, the wire connections from the sequence means may lead to a row of socket elements 70, such as are indicated in Fig. 8, each of which may carry a plurality of sockets 70A electrically connected together. The instrumentality, for example, the timer or the calculator is then wired to a suitable gang plug 71 which may be inserted in the proper sockets 70A to connect it for use.

One of the uses of the present device is, as above indicated, the automatic typing of the amounts indicated by the totalizer wheels of a calculating machine, but in order to do this, it will of course be necessary to modify somewhat the calculating machine construction. The modification however need be only in the accumulator wheels and such modifications are shown in Figs. 10 to 16.

Figures 11, 12, 13, 14:
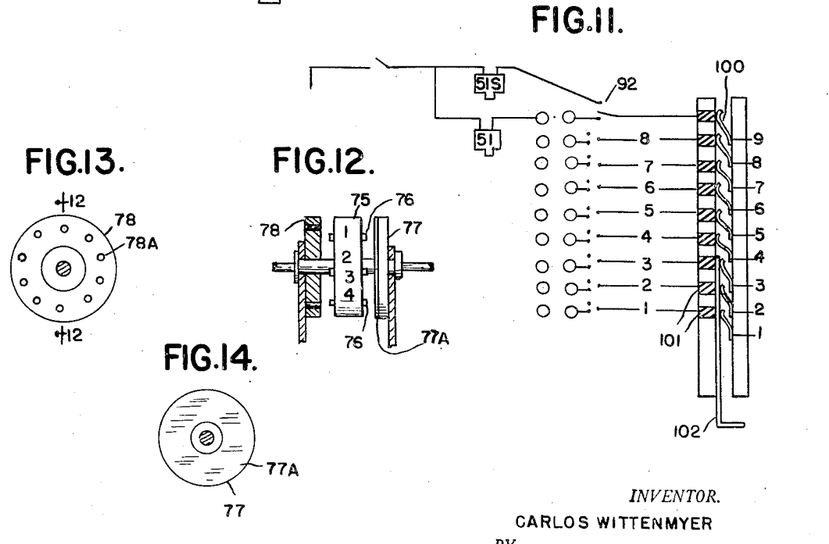
Figure 11 shows a means for electrically disconnecting certain of the counting wheels of a calculating machine.
Figure 12 shows a counting wheel modified for use with the printing sequence means.
Figure 13 is a side elevation of one of the discs shown in Figure 12.
Figure 14 is a side elevation of the other of said discs.

Referring first to Figure 12, an accumulator wheel is shown at 75, this being actuated conventionally by means not shown. Passing through the wheel 75 are three or more rods 76 all of the same length and one of which, and one only, is made of electrically conductive material. Mounted at the sides of wheel 75 and fixed against rotation are two discs 77 and 78, the disc 77 being faced with electrically conducting material 77A while the disc 78 carries a plurality of plugs 78A (Fig. 13) of electrically conducting material extending through it and even with the face opposed to the wheel 75.

Each of the discs 77A will be connected to one of the contacts of a sequence means, the disc at the accumulator wheel at the right being connected to the last contact on the sequence means; the disc at the next wheel to the next to last contact on the sequence means, and so on.

The several plugs 78A, of which there are ten in each disc 78, are each connected with a key operating solenoid 51 and each corresponds to a number on a wheel 75, so that when the latter stops, the two discs may be moved against the rods 76 and a circuit completed through the conducting rod to one of the plugs and thence to the corresponding typewriter key.

Figures 4, 10, 15:
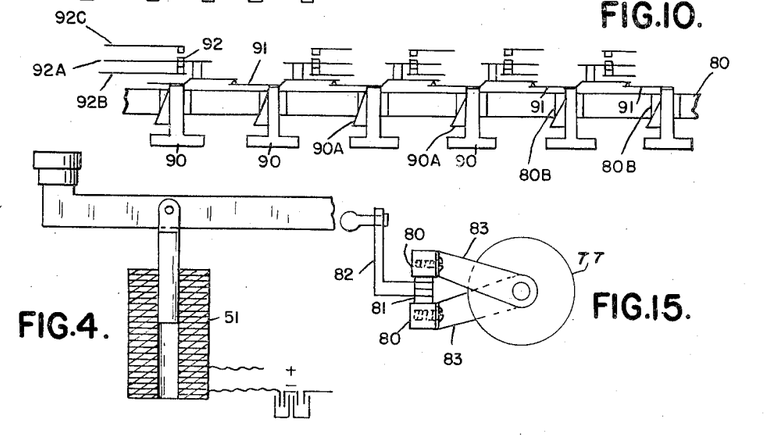
Figure 4 is a view of a typewriter key showing means for automatic operation.
Figure 10 is a diagrammatic view showing a row of calculating machine keys arranged to render inoperative those accumulators (numerals) to the left of the active accumulators (numerals).
Figures 15 and 16 show respectively an end and side elevation of means for actuating the discs shown in Figure 12.
Figure 16:
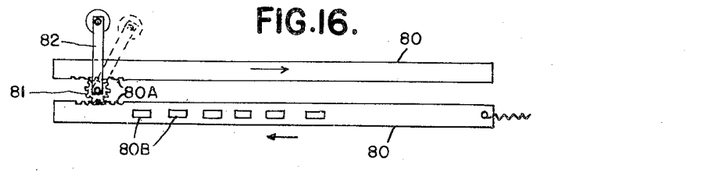

The discs 77 and 78 may be moved into contact with the wheel carried rods 76 by such means as is indicated in Figures 15 and 16, these showing two bars 80 provided with rack teeth 80A adapted to mesh with a gear 81 rotatable by means of a suitable handle 82 and also provided with arms 83 fixed to the discs 77 and 78, the arms on one bar 80 being fixed to discs 77 and those on the other bar being fixed to discs 78.

Figure 6:
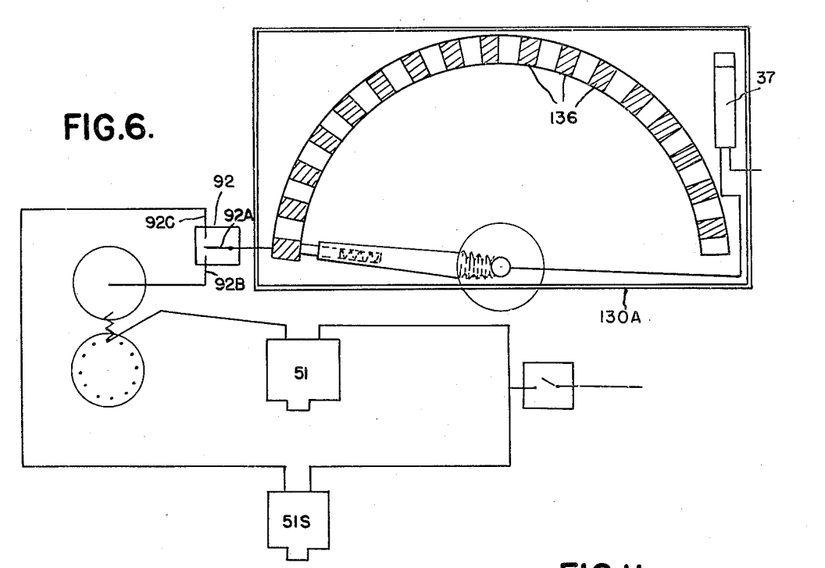
Figure 6 is a diagrammatic view of sequence means for use in printing the accumulations on calculating machines.

With a calculating machine provided with such accumlator wheels as have been described, means should be provided to prevent the printing of the entire series of figures shown thereby. For example, with a machine having accumulator wheels representing ten columns, in the printing of a number represented only in the right-hand columns, means should be provided to prevent the printing of zeros in all of the columns to the left of the whole number indicated. In other words, in printing e. g., the number 23456, it should not be printed 0000023456. Such means is indicated in Figures 6, 10 and 11.

In Figure 10 there are shown a row of keys 90 corresponding to the number of columns on the calculating machine and intended for use in the printing operation. These keys 90 are each provided with an arm 91 so arranged that operation of any key will also move all of those keys to its left. Each of the keys 90 is arranged to operate a two-way switch 92 which normally completes a circuit from the central member 92A through the arm 92B but, when the key is depressed, breaks this circuit and completes another circuit through the arm 92C. The location and operation of the switches 92 is shown in Figure 6.

In this figure, the sequence means 130A has its contacts 136 connected to the several central arms 92A of the switches 92 and the arms 92B of the latter are connected to the several discs 77A at the counting wheels, while the arms 92C are connected to the solenoid 51S, this being the solenoid for actuating the spacer. Therefore, when it is desired to omit printing of the four left hand colunms for example, the key 90 opposite the fourth column from the left is depressed. This bypasses the impulse from these four columns to the spacer key. The next column, however, will print—as will all of the columns to the right of the depressed key.

As described above in connection with Figures 15 and 16, the movement of the discs 77 and 78 may be accomplished by means of the handle 82. Figures 10 and 16, however, show another means by which such action may be accomplished.

In Fig. 16, the bars 80 are shown as racks actuable in opposite direction by a gear 81, the shaft of which is mounted in suitable bearings (not shown), operable by the handle 82. One of these bars 80 is slotted as shown in this figure and in Fig. 10, and is movable by any of the cams 90A. It is therefore obvious that the two bars 80 may be moved in opposite directions either by the handle 82 or a cam 90A acting on the slotted bar which, through gear 81, transmits the motion to the other bar 80.

Figure 11 illustrates a means by which as many of the right hand columns as desired, may be prevented from printing. In this figure, the several leads from the contacts in the sequence means are connected to spring fingers 100, normally resting on contacts 101 which in turn are connected to the switches 92. Arranged to be moved under the fingers 100, however, is an insulating bar 102, so that as many of the circuits as desired may be interrupted at this point.

In utilizing the time printing means described above, means must be provided for preventing printing during a time change on the time counting wheels, or rather, to prevent actuation of the time wheels during a printing operation.

Such means is shown in Figure 5 and consists of a small solenoid 153 which may be connected so as to be energized whenever the sequence means is moved to operative position. Whenever the solenoid 153 is energized, its armature 153A, being connected to a hook 153B, pivoted at 153C moves the hook down against the tension of spring 153D and prevents the recessive movement of the pawl 53C and thereby the turning of the wheel 54.

It will thus be seen that the means described above, provide for automatically typewriting results accumulated in calculating machines, the time of day, serial numbers, and similar matter at the discretion of the typist, and any one or all of these results is at his discretion.

In using calculating machines, for example, it is often desired to typewrite the results, and in doing this ordinarily, the typist is likely to and frequently does make errors in transcription. With the present machine, such errors are impossible as the calculating machine determines the characters printed by the typewriter.

Again, many forms commonly used in standard business practice are serially numbered and in many cases numbers are printed on the forms. This numbering operation not only adds to the printing cost, but requires that the forms be withdrawn from stock in serial order. With the present machine, serial numbering by the printer is unnecessary.

It is of course obvious that time or serial numbering machines used in the present combination need not have numbered wheels visible to the operator except for the operator's convenience, since the machine determines the numbers being printed.

Now having described the invention and the preferred embodiment thereof, it is to be understood that the invention is to be limited, not to the specific details herein set forth, but only by the scope of the claims which follow.

I claim:

1. In combination, a typewriter, having a carriage and a plurality of keys, and a device adapted to arrange a plurality of elements to present a series of characters to be typed, a plurality of solenoids each adapted when energized to actuate a typewriter key corresponding to one of said characters, a plurality of potential electric circuits each including one of said elements and the solenoid corresponding to the character carried thereby, means mechanically actuated by said carriage for momentarily completing said circuits in sequence said means including a roller movable at will to contact with said carriage and thereby cause such actuation, and means for supplying an electric current to each circuit as completed.

2. In a typewriter, a plurality of solenoids, each arranged to actuate, when energized, a typewriter key, and a sequence means for determining the sequence of energization of said solenoids, said sequence means consisting of an arcuate support, a plurality of stationary contacts carried thereby, a swinging arm provided with a contact adapted to meet said stationary contacts in sequence, means for swinging said arm, said swinging means comprising a roller adapted to be moved into contact with and to coact with the typewriter carriage and be moved thereby, means for connecting each of the stationary contacts with a key actuating solenoid and means for supplying electric current to the contact carried by said arm.

3. In a typewriter, a plurality of solenoids, each arranged to actuate when energized, a typewriter key, and a sequence means for determining the sequence of energization of said solenoids, said sequence means consisting of an arcuate support, a plurality of stationary contacts carried thereby, a swinging arm provided with a contact adapted to meet said stationary contacts in sequence, means for swinging said arm, said swinging means comprising a roller adapted to coact with the typewriter carriage and be moved thereby, key operated means for operatively connecting said roller and carriage, means for connecting each of the stationary contacts with a key actuating solenoid and means for supplying electric current to the contact carried by said arm, said connecting means including a selector adapted to determine which one of several solenoids is to be energized.

4. In a typewriter, a plurality of solenoids, each arranged to actuate, when energized, a typewriter key, and a sequence means for determining the sequence of energization of said solenoids, said sequence means consisting of an arcuate support, a plurality of stationary contacts carried thereby, a swinging arm provided with a contact adapted to meet said stationary contacts in sequence, means for swinging said arm, said swinging means comprising a roller adapted to coact with the typewriter carriage and be moved thereby, means for connecting each of the stationary contacts with a key actuating solenoid and means for supplying electric current to the contact carried by said arm, said connecting means including a plurality of contacts each connected to a solenoid and a contact movable to meet any one of the last mentioned plurality of contacts and key operated means for moving said sequence means into and out of operative connection with said carriage.

5. In a typewriter, a plurality of solenoids, each arranged to actuate, when energized, a typewriter key, and a sequence means for determining the sequence of energization of said solenoids, said sequence means consisting of an arcuate support, a plurality of stationary contacts carried thereby, a swinging arm provided with a contact adapted to meet said stationary contacts in sequence, means for swinging said arm, said swinging means comprising a roller adapted to coact with the typewriter carriage and be moved thereby, means for connecting each of the stationary contacts with a key actuating solenoid and means for supplying electric current to the contact carried by said arm, said connecting means including a register provided with rotatable wheels representing in their various rotated positions a plurality of characters and each carrying a single contact connected to one of the first mentioned stationary contacts, said register also including a non-rotatable disc adjacent each of said wheels and carrying a plurality of contacts equal in number to the characters represented by its adjacent wheel and each connected to one of said solenoids, means for bringing the single wheel-carried contact into contact relation with a disc-carried contact and key operated means for moving said sequence means into and out of operative connection with said carriage.

CARLOS WITTENMYER.

REFERENCES CITED

The following references are of record in the file of this patent:

UNITED STATES PATENTS

| Number | Name | Date |
|---|---|---|
| 1,130,776 | Voelker | Mar. 9, 1915 |
| 1,156,400 | Hall | Oct. 12, 1915 |
| 1,519,566 | Tiefenthaler | Dec. 16, 1924 |
| 1,786,391 | Grover et al. | Dec. 23, 1930 |
| 1,800,019 | Hewitt | Apr. 7, 1931 |
| 1,904,783 | Garrity et al. | Apr. 18, 1933 |
| 1,904,784 | Garrity et al. | Apr. 18, 1933 |
| 1,942,106 | Kottmann | Jan. 2, 1934 |
| 2,084,445 | Kottmann | June 22, 1937 |
| 2,139,103 | Vanderhider | Dec. 6, 1938 |
| 2,190,710 | Furber | Feb. 20, 1940 |
| 2,305,779 | Hebel | Dec. 22, 1942 |
| 2,305,798 | Sobisch | Dec. 22, 1942 |
| 2,318,325 | Nichol et al. | May 4, 1943 |
| 2,330,543 | Barthelmes | Sept. 28, 1943 |